April 12, 1932.                C. W. HEWLETT                1,853,812
                                SOUND RECORDING
                               Filed Dec. 4, 1929

Inventor
Clarence W. Hewlett,
by Charles E. Millar
His Attorney.

Patented Apr. 12, 1932

1,853,812

UNITED STATES PATENT OFFICE

CLARENCE W. HEWLETT, OF SCHENECTADY, NEW YORK, ASSIGNOR TO GENERAL ELECTRIC COMPANY, A CORPORATION OF NEW YORK

SOUND RECORDING

Application filed December 4, 1929. Serial No. 411,625.

My invention relates to the recording of sound photographically on a moving light-sensitive member. When reproduction is made from photographic sound records such as are in common use, a certain amount of ground noise is heard which to a large extent is known to be the result of the light which enters the photo-electric cell forming a part of the reproducing apparatus being interrupted by dirt and scratches on the film. When the sound being reproduced is relatively loud the ground noise is not noticeable but when the amplitude of the sound waves decreases the ground noise by comparison becomes the more apparent. It is particularly noticeable before the sound starts and after it ceases.

It is the object of my invention to provide an improved sound recording apparatus by means of which a record may be made such that upon reproduction the amount of ground noise heard is reduced to a minimum.

My invention will be better understood from the following description taken in connection with the accompanying drawings, and its scope will be pointed out in the appended claims.

Figure 1:
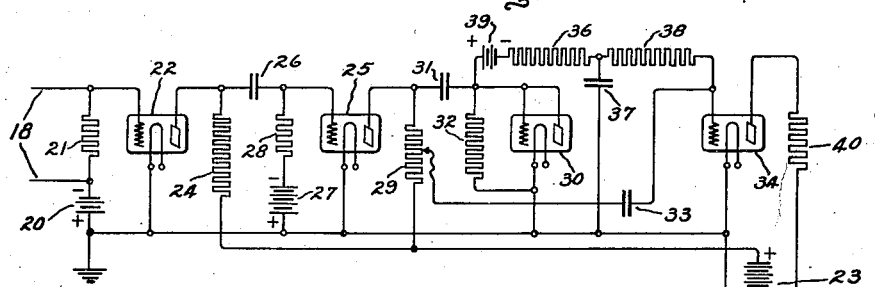
Figure 2:
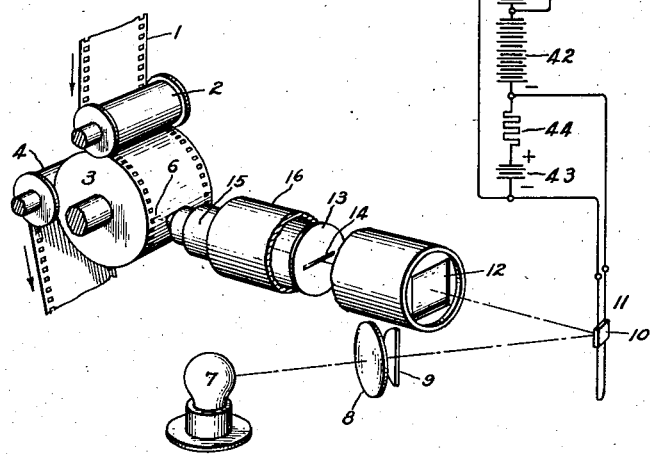
Figure 2:
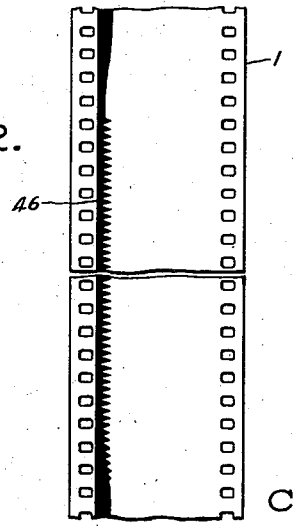

Referring to the drawings, Fig. 1 is a combined circuit diagram and perspective view of apparatus embodying my invention for making a sound record of the variable width type; and Fig. 2 shows portions of a film having a variable width sound record thereon made by the apparatus shown in Fig. 1.

A preferred method of making a sound record of the variable width type is to employ an oscillograph galvanometer connected to a suitable sound pick-up device through one or more thermionic amplifiers and arranged to reflect a light beam on the moving film. The beam reaching the film should be a very narrow line of light extending transversely of the direction of motion of the film. The galvanometer is arranged to cause the light beam to vibrate in a direction also transverse to the direction of motion of the film, the length of the light line which impinges on the film varying in accordance with the vibrations of the beam. Since the current which actuates the galvanometer is alternating in character the reflected light beam swings on both sides of its normal or zero deflection position. With the moving element of the galvanometer at rest the latter heretofore usually has been adjusted to cause the light line on the film to cover approximately one half of the width of the sound track, which is the strip on the film reserved for the sound record, hence in the recording operation the portion of the film exposed by the light line has varied each side of the center line of the sound track.

In Fig. 1 of the drawings I have shown the unexposed film 1 upon which the sound record is to be photographed passing down under the guide roll 2, over the drum 3 and over a second roll 4. In order to simplify the drawings I have purposely omitted showing any means for driving the film as well as the usual magazines, enclosing casings, etc. which constitute parts of the complete apparatus since they form no part of my present invention. At the point of exposure, the film is supported on the surface of the drum and may be moved at that point either by the drum through suitable connections with a driving motor or to be moved by rolls or sprockets connected with the motor.

The optical system by means of which the narrow line of light 6 is focused on the film is shown, for example, as comprising the electric lamp 7 forming the light source, the condensing lens 8, the light stop 9 for producing a sharp working edge on the light beam, the mirror 10 of the oscillograph galvanometer 11 of standard construction, the cylindrical lens 12, the screen 13 having a narrow opening 14 therein, and the microscope objective 15. Elements 12 to 15 inclusive, it will be noted, are mounted for convenience in the tube 16, the objective 15 being adjustable therein to facilitate focusing the light beam on the film. The light beam which passes the vertical edge of the stop 9 is reflected by the mirror 10 into the tube 16 on screen 13 being concentrated in one meridian by the cylindrical lens 12. As the mirror vibrates the reflected beam vibrates in the direction of the opening 14 in screen 13 illuminating more or less of the opening. That part of the opening which at any instant is illuminated is imaged on a reduced scale on the film forming the light line 6. As the film moves uniformly past the focused beam forming the light line the variation in length of the line in accordance with the sound waves exposes the film in a manner to form a sound record of the variable width type, as shown, for example, at the left side of the positive film illustrated by Fig. 2.

In making such a record, as has already been pointed out above, the zero deflection position of the galvanometer heretofore has been adjusted to cause the dividing line between the exposed and the unexposed portion of the sound track to vibrate equally on both sides of the center line of the sound track. Accordingly when no sound is being recorded, substantially one half of the sound track is exposed and the other half is unexposed. The unexposed half of the negative and the opposite half of the positive print therefore, are clear. It is this portion when the record is being reproduced which gives rise to the objectionable ground noise.

To make a negative sound record with the above described apparatus I cause the opening 14 to be illuminated for its entire length when no sound is being recorded, hence the line of light 6 has a maximum length and the entire sound track on the negative is black after development. When the sound comes on, the galvanometer mirror not only is vibrated in accordance with the sound waves but the zero about which the oscillation takes place is shifted in accordance with the amplitude of the waves. The resulting record as illustrated by Fig. 2 has the wave peaks extending the full width of the sound track but at those times where there is no sound the sound track is entirely black, hence no light enters the photo-electric cell. I shall now describe the apparatus which I have devised for causing the galvanometer to function in this manner.

The circuit 18 carrying the input signal to be recorded is shown connected across the resistance 21 which for example may have a value of ½ megohm. The terminals of this resistance are connected respectively to the grid and filament of the thermionic amplifier 22 biased by the battery 20. The plate circuit of this amplifier is shown fed from the battery 23, which for example may be 450 volts, through the load impedance 24 which for example may be a 30,000 ohms resistance and is connected to the grid of the thermionic amplifier 25 through the condenser 26 which may have a value of 0.1 mf. Amplifier 25 is biased by battery 27 through resistance 28 and has the load impedance 29 which for example may be 4,000 ohms. Reference number 30 represents a rectifier of the thermionic type. Although this rectifier need have but two elements it has been shown on the drawings as a three-element device, the grid of which not being used as such is tied to the plate. It is fed from amplifier 25 through the condenser 31 which may have a value of 2 mf. The rectified current passes through the grid leak 32, for example, of 22,500 ohms, to the filament. A suitable portion of the amplified signal from the amplifier 25 is applied through the condenser 33 which may have a value for example of 0.1 mf. to the grid of the thermionic amplifier 34 which should have a relatively large capacity. If desired the necessary capacity may be obtained by the use of a plurality of smaller amplifiers connected in multiple. The voltage established by the rectified current from the device 30 is applied to the grid of the amplifier 34 to bias the same. This rectified voltage is filtered by the resistance 36 and the condenser 37 which for example may have values respectively of 100,000 ohms and 0.1 mf. so as to produce a substantially uniform biasing voltage whose value depends upon the peak value of the signal waves. Resistance 38, which, for example, may be of 100,000 ohms, serves as a portion of the grid leak of the amplifier 34. The magnitude of the signal received by amplifier 34 from amplifier 25 through the resistance 29 is so chosen that the peak values of these signals are just equal to or are a little less than the bias produced by the operation of the device 30. A small additional bias, shown as the battery 39, is applied to the grid of the amplifier 34 so as to be sure that its grid will not gather any electrons. A resistance 40, having for example a value of 50 ohms, is shown placed in the plate circuit of the amplifier 34 partly to straighten out the characteristic and partly to protect the circuit against short circuits. The conductor loop of the oscillograph galvanometer 11, preferably for greater safety, is arranged in the plate circuit on the ground side of the plate battery 42. The loop is by-passed by the battery 43 and resistance 44 in series so that the steady plate current of the amplifier 34 may be balanced out. Variations in the plate current will divide between the resistance and the galvanometer loop in the usual way.

By referring to Fig. 2 it will be seen that the negative film 1 illustrated therein has a sound record 46 thereon which for convenience is shown as that of a constant note, the height of the peaks of the record waves being substantially equal to the full width of the sound track. It will also be seen that before the sound began and after it ceased the entire sound record track is black, hence substantially no light enters the photo-electric cell when there is no sound and the consequent ground noise is a minimum.

The operation of the apparatus illustrated in Fig. 1 will now be described. When there is no sound being recorded there is no current through the oscillograph galvanometer and the latter is so adjusted that the entire opening 14 in screen 13 is illuminated, hence the light line 6 covers the whole width of the sound track. When the sound comes on, the negative bias on the device 34 increases so that the mean plate current is depressed by an amount equal to or slightly greater than the peak value of the current impulses. The result of this change in the mean value of the plate current which passes through the oscillograph galvanometer is to shift the working edge of the light beam just enough or a little more than enough to accommodate the full swing of the vibrations of the beam. When the sound ceases, the plate current assumes its normal value and the entire opening 14 is again illuminated thereby exposing the entire sound track as before. The interval of time required for the mean plate current to assume its proper value is determined by the coupling condenser 31 and the grid leak resistance 32 and also partly by the resistance 36 and condenser 37. As shown in Fig. 2 with apparatus having resistance and capacity values such as those mentioned a few cycles are required for the signal to reach its full amplitude, this however does not materially effect the sound of the record when reproduced.

It will be noted that the film illustrated in Fig. 2 is a negative and that the apparatus shown in Fig. 1 and described above is for making such a negative. My invention, however, is not limited to apparatus for making a negative sound record of the character illustrated but is equally applicable to apparatus for making a record such that a positive print made therefrom shall be of the character illustrated. If such a print is desired it is necessary only to make certain adjustments to the apparatus, namely to rotate the stop 9 through 180° and to adjust the moving system of the galvanometer so that no part of the opening 14 is illuminated but with the working edge of the light beam at one end of the opening. Then as the mirror vibrates in response to the sound more or less of the opening 14 is covered by the light beam. The negative thus made is the reverse of that shown in Fig. 2 so that a print made herefrom will appear like Fig. 2.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States, is:

1. Apparatus for photographically recording sound on a moving light-sensitive member comprising means for directing a beam of light on said member, a thermionic amplifier having its plate circuit connected with said means for controlling said beam, means for varying the grid potential of said amplifier in accordance with the sound waves to be recorded whereby the light is caused to vibrate relative to a predetermined zero, and means for varying said zero in accordance with the peak value of said waves including means for varying the grid bias of said amplifier.

2. Apparatus for photographically recording sound on a moving light-sensitive member comprising a source of light, a galvanometer for reflecting and vibrating a light beam from said source on said member, a thermionic amplifier having its plate circuit connected with said galvanometer, means for varying the grid potential of said amplifier in accordance with the sound waves to be recorded whereby the light beam vibrates with respect to a predetermined zero in response to the sound waves, and means for varying the position of said zero in accordance with the peak value of said waves, said light means including means for applying to the grid of said amplifier a bias responsive to said peak value.

3. Apparatus for photographically recording sound on a moving light-sensitive member comprising a source of light, a galvanometer for reflecting and vibrating a light beam from said source on said member, an input circuit the current in which varies in accordance with the sound waves to be recorded, a thermionic amplifier between said circuit and said galvanometer, and means for producing a displacement of the zero of said galvanometer in accordance with the peak value of the sound waves, said means comprising a thermionic rectifier connected with said circuit for applying to the grid of said amplifier a biasing potential substantially in accordance with the peak values of the amplified waves.

4. Apparatus for photographically recording sound on a moving light-sensitive member comprising a source of light, a galvanometer for reflecting and vibrating a light beam from said source on said member, an input circuit the current in which varies in accordance with the sound waves to be recorded, a thermionic amplifier having its plate conductively connected with said galvanometer and its grid connected with said input circuit, and a thermionic rectifier and filtering device connecting said input circuit and said grid for supplying a biasing potential to said grid.

5. Apparatus for photographically recording sound on a moving film comprising a source of light, a galvanometer arranged to reflect and vibrate a light beam from said source on said film, an input circuit, a thermionic amplifier having its plate connected with said galvanometer and its grid connected with said input circuit, a thermionic rectifier and filtering device connecting said input circuit and said grid for supplying a biasing potential to said grid, and means connected with said galvanometer for balancing out the plate current of said amplifier when there is no sound.

6. Apparatus for photographically recording sound on a moving film comprising a source of light, a galvanometer arranged to reflect and vibrate a light beam from said source on said film, an input circuit, a thermionic amplifier having the galvanometer arranged in series in its plate discharge circuit and having its grid connected with the input circuit, thermionic rectifying and filtering apparatus connected with said input circuit and arranged to supply said grid a substantially uniform biasing potential depending upon the average peak value of the current in the input circuit.

In witness whereof, I have hereunto set my hand this 3rd day of December, 1929.

CLARENCE W. HEWLETT.